(12) United States Patent
Lee et al.

(10) Patent No.: US 9,159,491 B2
(45) Date of Patent: Oct. 13, 2015

(54) MULTILAYER CERAMIC ELECTRONIC COMPONENT AND MOUNTING BOARD THEREFOR

(71) Applicant: SAMSUNG ELECTRO-MECHANICS CO., LTD., Suwon, Gyunggi-do (KR)

(72) Inventors: Min Gon Lee, Gyunggi-do (KR); Seung Ho Lee, Gyunggi-do (KR); Jong Han Kim, Gyunggi-do (KR); Yoon Hee Lee, Gyunggi-do (KR); Sung Hwan Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 231 days.

(21) Appl. No.: 13/974,759

(22) Filed: Aug. 23, 2013

(65) Prior Publication Data
US 2014/0355176 A1 Dec. 4, 2014

(30) Foreign Application Priority Data

May 31, 2013 (KR) .................. 10-2013-0062512

(51) Int. Cl.
*H01G 4/005* (2006.01)
*H01G 4/012* (2006.01)
(Continued)

(52) U.S. Cl.
CPC ............ *H01G 4/012* (2013.01); *H01G 4/0085* (2013.01); *H01G 4/30* (2013.01); *H01G 4/12* (2013.01)

(58) Field of Classification Search
CPC ............ H01G 4/30; H01G 4/12; H01G 4/012
USPC .................. 361/303, 304–305, 301.2, 301.4, 361/309–313, 306.1, 306.3, 321.1, 321.2
See application file for complete search history.

(56) References Cited

U.S. PATENT DOCUMENTS 6,550,117 B1 * 4/2003 Tokuoka et al. ............. 29/25.42
7,295,421 B2 * 11/2007 Mihara et al. ............. 361/308.1
(Continued)

FOREIGN PATENT DOCUMENTS

| JP | 08-115845 A | 5/1996 |
|---|---|---|
| JP | 10-172855 A | 6/1998 |

(Continued)

OTHER PUBLICATIONS

Japanese Office Action issued in corresponding Japanese Application No. 2013-163070, dated May 27, 2014, with English translation.

*Primary Examiner* — Nguyen T Ha
(74) *Attorney, Agent, or Firm* — McDermott Will & Emery LLP

(57) ABSTRACT

There is provided a multilayer ceramic electronic component including a ceramic body including dielectric layers, and first and second internal electrodes formed within the ceramic body and disposed to face each other having the respective dielectric layers interposed therebetween, wherein in a cross-section of the ceramic body in a length-thickness (L-T) direction, when an area of non-electrode regions in cover part internal electrodes among the first and second internal electrodes is defined as $A_{cover}$ and an area of non-electrode regions in center part internal electrodes among the first and second internal electrodes is defined as $A_{center}$, a ratio of $A_{center}$ to $A_{cover}$ satisfies $0.33 \leq A_{center}/A_{cover} \leq 0.95$.

14 Claims, 5 Drawing Sheets

(51) Int. Cl.
*H01G 4/30* (2006.01)
*H01G 4/008* (2006.01)
*H01G 4/12* (2006.01)

(56) References Cited

U.S. PATENT DOCUMENTS 7,433,173 B2 * 10/2008 Iwasaki et al. ............. 361/321.4
9,048,026 B2 * 6/2015 Ahn et al. ............................ 1/1
2014/0177133 A1 * 6/2014 Lee et al. .................... 361/321.4
2014/0376150 A1 * 12/2014 Kim et al. ................... 361/301.4

FOREIGN PATENT DOCUMENTS

| JP | 2002-164248 A | 6/2002 |
| JP | 2004-311985 A | 11/2004 |
| JP | 2007-036003 A | 2/2007 |
| JP | 2007-335726 A | 12/2007 |

* cited by examiner

A-A'

B-B'

MULTILAYER CERAMIC ELECTRONIC COMPONENT AND MOUNTING BOARD THEREFOR

CROSS-REFERENCE TO RELATED APPLICATIONS

This application claims the priority of Korean Patent Application No. 10-2013-0062512 filed on May 31, 2013, in the Korean Intellectual Property Office, the disclosure of which is incorporated herein by reference.

BACKGROUND OF THE INVENTION

1. Field of the Invention

The present invention relates to a multilayer ceramic electronic component and a mounting board therefor.

2. Description of the Related Art

Generally, electronic components using a ceramic material, such as a capacitor, an inductor, a piezoelectric element, a varistor, a thermistor, or the like, include a ceramic body made of a ceramic material, internal electrodes formed within the ceramic body, and external electrodes mounted on external surfaces of the ceramic body so as to be connected to the internal electrodes.

Among ceramic electronic components, a multilayer ceramic capacitor includes a plurality of stacked dielectric layers, internal electrodes disposed to face each other, having the dielectric layer interposed therebetween, and external electrodes electrically connected to the internal electrodes.

Multilayer ceramic capacitors have been widely used as components in mobile communications devices such as laptop computers, personal digital assistants (PDAs), mobile phones, and the like, due to advantages thereof such as a small size, high capacitance, ease of mounting, or the like.

In accordance with the recent trend toward electronic devices having high performance as well as compact, slim form factors, demands have been made for electronic components having a small size, high performance, and high capacitance. In particular, as CPUs are increasingly being provided with higher speeds, the slimness, lightweightness, digitalization, and multifunctionalization of devices have increased, research into technology for implementing multilayer ceramic capacitor characteristics such as miniaturization, thinness, high capacitance, low impedance in a high frequency region, and the like, have been actively ongoing.

In addition, a multilayer ceramic capacitor has been usefully used as a bypass capacitor disposed in a power supply circuit in a large scale integration (LSI) scheme. The multilayer ceramic capacitor serving as the bypass capacitor needs to effectively remove high frequency noise. This demand is further increasing in accordance with the trend in which electronic devices increasingly operate in a high frequency band. The multilayer ceramic capacitor used as the bypass capacitor may be electrically connected to a mounting pad on a circuit board through soldering, and the mounting pad may be connected to other external circuits through wiring patterns or conductive vias in the circuit board.

RELATED ART DOCUMENT (Patent Document 1) Japanese Patent Laid-Open Publication No. JP 2002-164248

SUMMARY OF THE INVENTION

An aspect of the present invention provides a multilayer ceramic electronic component and a mounting board therefor.

According to an aspect of the present invention, there is provided a multilayer ceramic electronic component including: a ceramic body including dielectric layers; and first and second internal electrodes formed within the ceramic body and disposed to face each other having the respective dielectric layers interposed therebetween, wherein in a cross-section of the ceramic body in a length-thickness (L-T) direction, when an area of non-electrode regions in cover part internal electrodes among the first and second internal electrodes is defined as $A_{cover}$ and an area of non-electrode regions in center part internal electrodes among the first and second internal electrodes is defined as $A_{center}$, a ratio of $A_{center}$ to $A_{cover}$ satisfies $0.33 \leq A_{center}/A_{cover} \leq 0.95$.

When a thickness of each of the dielectric layers is defined as Td and a thickness of each of the first and second internal electrodes is defined as Te, $0.5 \leq Te/Td \leq 1.2$ may be satisfied.

When a content of a ceramic filler based on a conductive metal in the cover part internal electrodes is defined as $C_{cover}$ and a content of the ceramic filler based on the conductive metal in the center part internal electrodes is defined as $C_{center}$, $1.05 \leq C_{cover}/C_{center} \leq 3.00$ may be satisfied.

The conductive metal may include at least one selected from a group consisting of nickel (Ni), manganese (Mn), chrome (Cr), copper (Cu), palladium (Pd), silver (Ag), cobalt (Co), and aluminum (Al).

The ceramic filler may include a ceramic material.

When a thickness of each of the first and second internal electrodes is defined as Te, $0.1\ \mu m \leq Te \leq 0.5\ \mu m$ may be satisfied.

The dielectric layers are stacked in an amount of 7 layers or more, per 10 μm of thickness of the ceramic body.

According to another aspect of the present invention, there is provided a mounting board for a multilayer ceramic electronic component, the mounting board including: a printed circuit board having first and second electrode pads disposed thereon; and a multilayer ceramic electronic component installed on the printed circuit board, the multilayer ceramic electronic component including: a ceramic body including dielectric layers; and first and second internal electrodes formed within the ceramic body and disposed to face each other having the respective dielectric layers interposed therebetween, wherein in a cross-section of the ceramic body in a length-thickness (L-T) direction, when an area of non-electrode regions in cover part internal electrodes among the first and second internal electrodes is defined as $A_{cover}$ and an area of non-electrode regions in center part internal electrodes among the first and second internal electrodes is defined as $A_{center}$, a ratio of $A_{center}$ to $A_{cover}$ satisfies $0.33 \leq A_{center}/A_{cover} \leq 0.95$.

When a thickness of each of the dielectric layers is defined as Td and a thickness of each of the first and second internal electrodes is defined as Te, $0.5 \leq Te/Td \leq 1.2$ may be satisfied.

When a content of a ceramic filler based on a conductive metal in the cover part internal electrodes is defined as $C_{cover}$ and a content of the ceramic filler based on the conductive metal in the center part internal electrodes is defined as $C_{center}$, $1.05 \leq C_{cover}/C_{center} \leq 3.00$ may be satisfied.

The conductive metal may include at least one selected from a group consisting of nickel (Ni), manganese (Mn), chrome (Cr), copper (Cu), palladium (Pd), silver (Ag), cobalt (Co), and aluminum (Al).

The ceramic filler may include a ceramic material.

When a thickness of each of the first and second internal electrodes is defined as Te, $0.1\ \mu m \leq Te \leq 0.5\ \mu m$ may be satisfied.

The dielectric layers may be stacked in an amount of 7 layers or more, per 10 μm of thickness of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
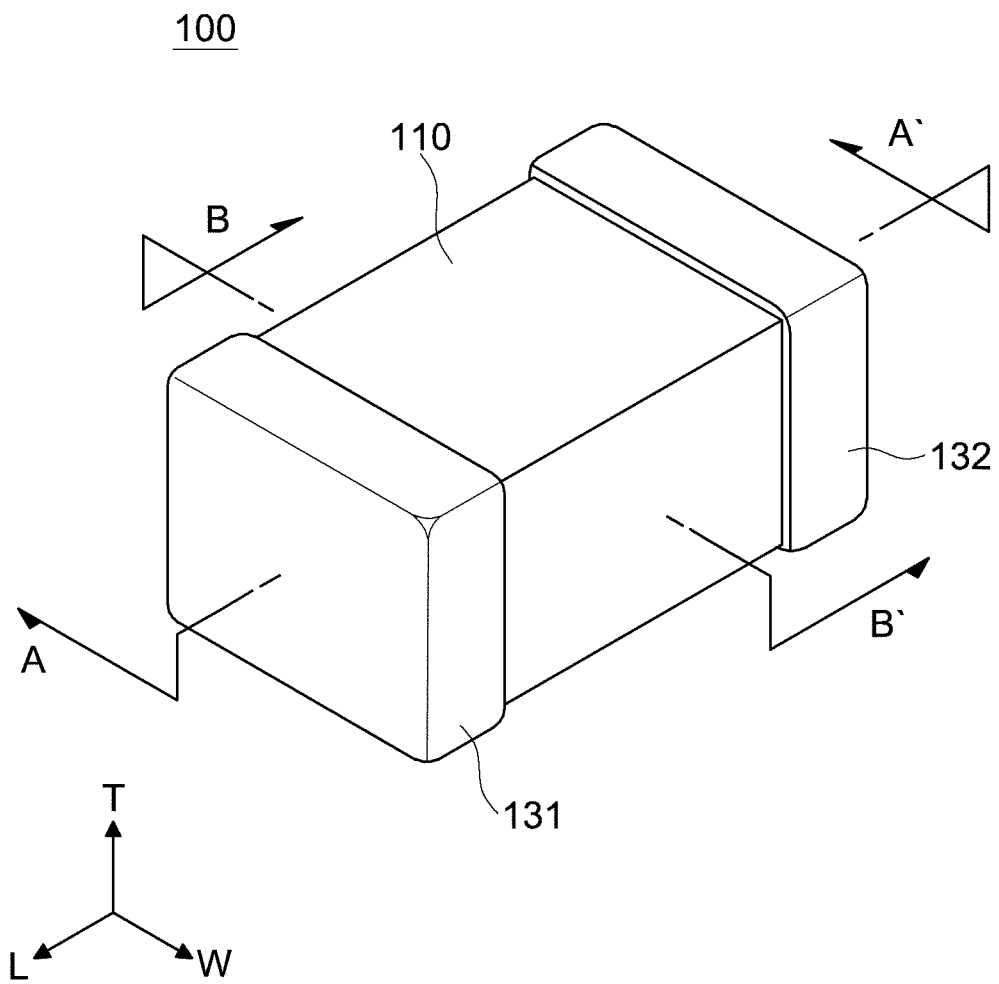
FIG. 1 is a schematic perspective view showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Multilayer ceramic Electronic Component

An embodiment of the present invention relates to a multilayer ceramic electronic component, and the electronic component formed using a ceramic material may include a capacitor, an inductor, a piezoelectric element, a varistor, a thermistor, or the like. Hereinafter, as an example of the multilayer ceramic electronic component, a multilayer ceramic capacitor will be described.

FIG. 1 is a schematic perspective view showing the multilayer ceramic capacitor according to an embodiment of the present invention.

Figure 2A:
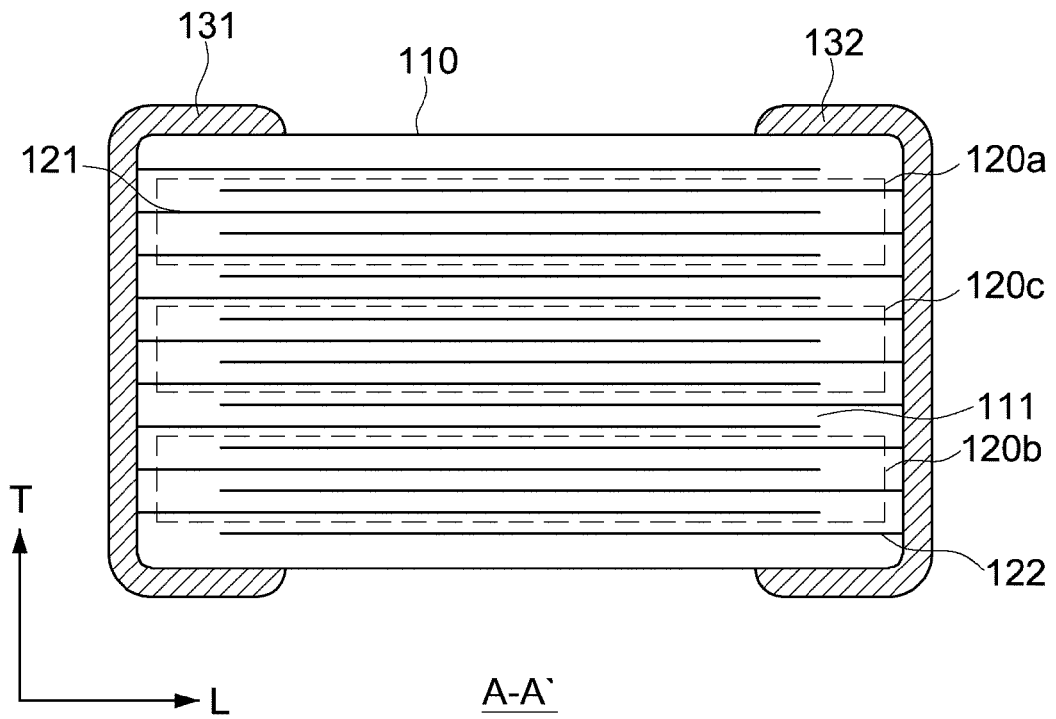
FIG. 2A is a schematic cross-sectional view showing the multilayer ceramic capacitor taken along line A-A' of FIG. 1.

FIG. 2A is a schematic cross-sectional view showing the multilayer ceramic capacitor taken along line A-A' of FIG. 1.

Figure 2B:
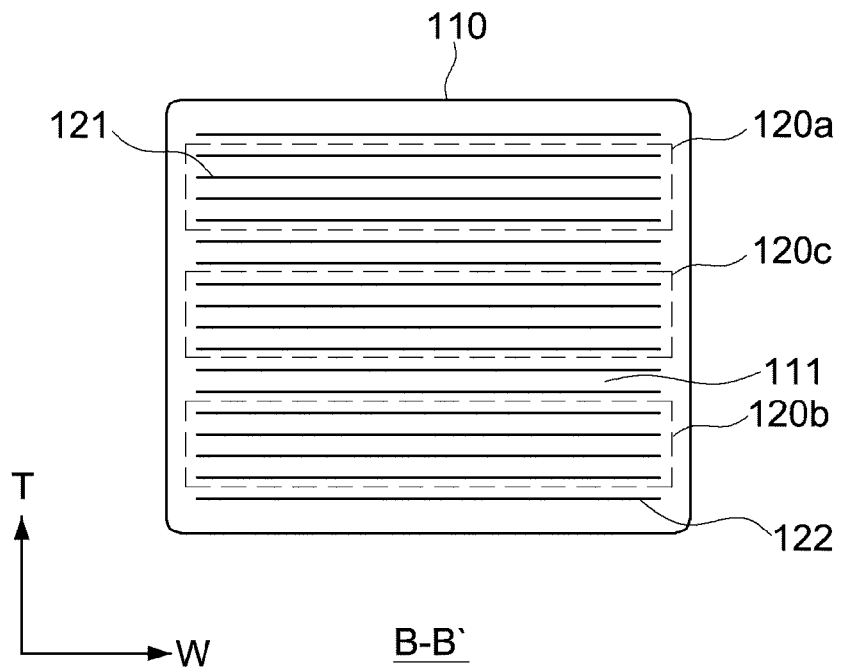
FIG. 2B is a schematic cross-sectional view showing the multilayer ceramic capacitor taken along line B-B' of FIG. 1.

FIG. 2B is a schematic cross-sectional view showing the multilayer ceramic capacitor taken along line B-B' of FIG. 1.

Referring to FIGS. 1, 2A, and 2B, the multilayer ceramic capacitor according to the embodiment of the present invention may include a ceramic body 110 including dielectric layers 111, first and second internal electrodes 121 and 122 formed within the ceramic body 110 and disposed to face each other having the respective dielectric layers 111 interposed therebetween, and first and second external electrodes 131 and 132 formed on outer surfaces of the ceramic body 110.

In the multilayer ceramic capacitor according to the embodiment of the present invention, a 'length direction' may refer to an 'L' direction of FIG. 1, a 'width direction' may refer to a 'W' direction of FIG. 1, and a 'thickness direction' may refer to a 'T' direction of FIG. 1. Here, the 'thickness direction' may be used to have the same meaning as a direction in which dielectric layers are stacked, that is, a 'stacking direction'.

The ceramic body 110 is not specifically limited in view of a shape, but may have a hexahedral shape according to the embodiment of the present invention.

The ceramic body 110 may be formed by stacking the plurality of dielectric layers 111.

The plurality of dielectric layers 111 configuring the ceramic body 110 may be in a sintered state and be integrated so as not to confirm boundaries between the adjacent dielectric layers.

The dielectric layers 111 may be formed by sintering ceramic green sheets including a ceramic powder.

The ceramic powder is not specifically limited as long as it is generally used in the art.

The ceramic powder may include $BaTiO_3$-based ceramic powder. However, the present invention is not limited thereto.

Examples of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, and the like, obtained by introducing Ca, Zr, or the like, into $BaTiO_3$, but may not limited thereto.

In addition, the ceramic green sheets may include a transition metal, rare earth elements, magnesium (Mg), aluminum (Al), or the like, in addition to the ceramic powder.

A thickness of each dielectric layer 111 may be appropriately changed according to a capacitance design of the multilayer ceramic capacitor.

For example, the thickness of the dielectric layer 111 formed between two internal electrodes adjacent to each other after a sintering process may be 0.6 μm or less, but is not limited thereto.

The first and second internal electrodes 121 and 122 may be formed within the ceramic body 110.

The first and second internal electrodes 121 and 122 may be formed on the ceramic green sheet, stacked and sintered, such that they are formed within the ceramic body 110, having each dielectric layer interposed therebetween.

The first and second internal electrodes may be formed as a pair of electrodes, that is, the first internal electrode 121 and the second internal electrode 122 having different polarities, and may be disposed to face each other in the direction in which the dielectric layers are stacked.

As shown in FIG. 2A, ends of the first and second internal electrodes 121 and 122 may be alternately exposed to respective one surfaces of the ceramic body 110 in the length direction.

In addition, although not shown, the first and second internal electrodes according to the embodiment of the present invention may have lead parts, and may be exposed to the same surface of the ceramic body through the lead parts.

Alternatively, the first and second internal electrodes 121 and 122 may have the lead parts, and may be exposed to at least one surface of the ceramic body through the lead parts.

The first and second external electrodes 131 and 132 may be formed on the outer surfaces of the ceramic body 110 and may be electrically connected to the first and second internal electrodes 121 and 122, respectively.

More specifically, the first external electrode 131 electrically connected to the first internal electrode 121 exposed to one surface of the ceramic body 110 and the second external electrode 132 electrically connected to the second internal electrode 122 exposed to the other surface of the ceramic body 110 may be provided.

In addition, although not shown, a plurality of external electrodes may be formed such that they are connected to the respective first and second internal electrodes exposed to the ceramic body.

The first and second external electrodes 131 and 132 may be formed of a conductive paste including a metal powder.

An example of the metal powder included in the conductive paste may include nickel (Ni), copper (Cu), or alloys thereof, but is not specifically limited thereto.

The first and second external electrodes 131 and 132 may respectively have a thickness appropriately determined according to a usage thereof, or the like, for example, a thickness of 10 to 50 μm.

Figure 3:
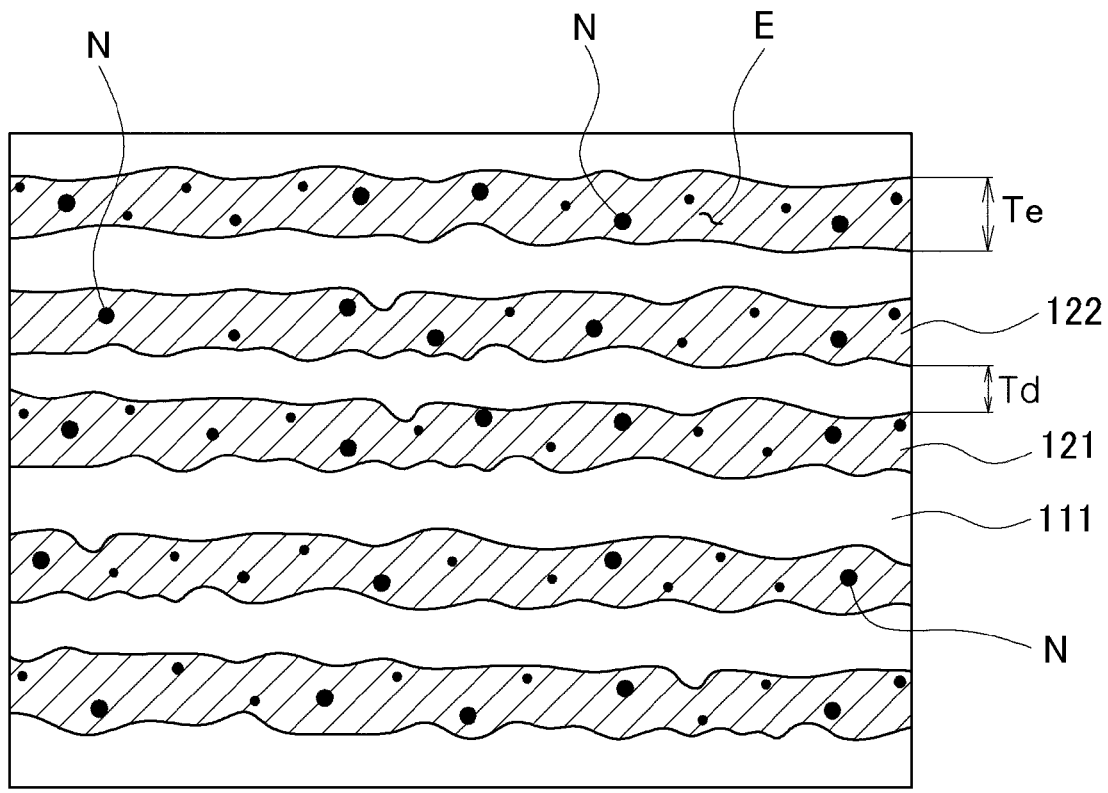
FIG. 3 is an enlarged view schematically showing dielectric layers and internal electrodes of the multilayer ceramic capacitor according to the embodiment of the present invention.

FIG. 3 is an enlarged view schematically showing dielectric layers and internal electrodes of the multilayer ceramic capacitor according to the embodiment of the present invention.

Figure 4:
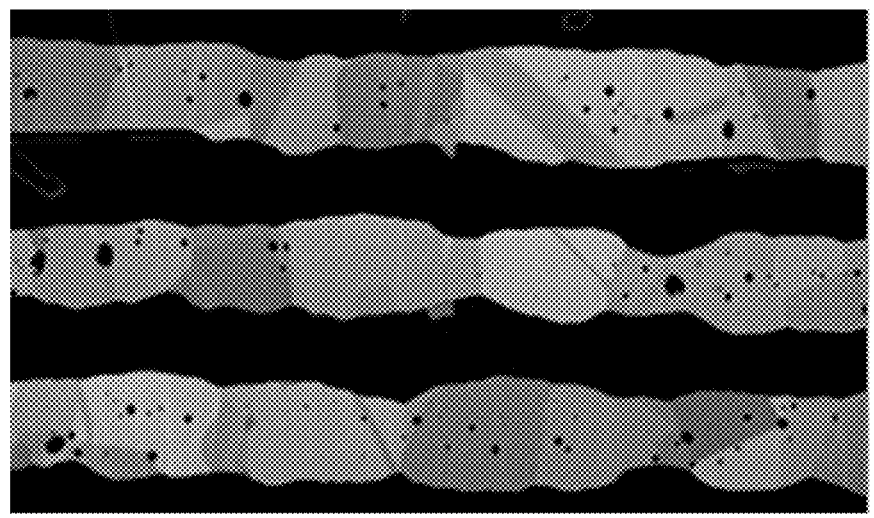
FIG. 4 is a scanning electronic microphotograph (SEM) showing the dielectric layers and the internal electrodes in a cross-section of the multilayer ceramic capacitor according to the embodiment of the present invention.

FIG. 4 is a scanning electronic microphotograph (SEM) showing the dielectric layers and the internal electrodes in a cross-section of the multilayer ceramic capacitor according to the embodiment of the present invention.

Referring to FIG. 3, the first and second internal electrodes 121 and 122 of the multilayer ceramic capacitor according to the embodiment of the present invention may include non-electrode regions N therein. According to the embodiment of the present invention, the remaining regions other than the non-electrode regions N in the first and second internal electrodes 121 and 122 may be electrode regions E.

According to the embodiment of the present invention, the non-electrode regions N may be formed during a sintering process of the first and second internal electrodes, and may be formed by using a composition of the conductive paste for forming the internal electrode.

The non-electrode regions (N) may contain a ceramic filler, but is not limited thereto.

Regions brightly shown in the scanning electron microphotograph (SEM) of FIG. 4 indicate internal electrodes, and small regions darkly shown in the internal electrodes indicate the non-electrode regions.

Referring to FIGS. 3 and 4, the first and second internal electrodes 121 and 122 may contain a conductive metal and a ceramic filler, and may include the electrode regions E that are formed of the conductive metal and the non-electrode regions N that are formed of the ceramic filler and do not contribute to capacitance formation.

Types of the conductive metal for forming the first and second internal electrodes 121 and 122 are not particularly limited, but for example, may include a base metal.

The conductive metal may include at least one selected from a group consisting of nickel (Ni), manganese (Mn), chrome (Cr), cobalt (Co), aluminum (Al), and alloys thereof, but is not limited thereto.

In addition, the ceramic filler may be formed of the same ceramic powder used for forming the dielectric layers 111, for example, may be formed of a barium titanate ($BaTiO_3$) powder, but is not limited thereto.

The amount of the ceramic filler included in the first and second internal electrodes 121 and 122 is adjusted, such that the non-electrode regions N in the first and second internal electrodes may be controlled to enhance strength of the internal electrodes and alleviate sintering shrinkage stress, thereby suppressing a crack generation during the shrinking of the internal electrodes.

More specifically, in a cross-section of the ceramic body in a length-thickness (L-T) direction, when an area of the non-electrode regions N in cover part internal electrodes 120a and 120b among the first and second internal electrodes is defined as $A_{cover}$ and an area of the non-electrode regions N in center part internal electrodes 120c among the first and second internal electrodes is defined as $A_{center}$, the areas of the non-electrode regions N may be controlled such that a ratio of $A_{center}$ to $A_{cover}$ may satisfy $0.33 \leq A_{center}/A_{cover} \leq 0.95$.

Referring to FIG. 2A, the cover part internal electrodes 120a and 120b refer to second to fifth internal electrodes from an upper portion of the ceramic body among the first and second internal electrodes or second to fifth internal electrodes from a lower portion of the ceramic body among the first and second internal electrodes, except for the outermost internal electrodes in the stacking direction of the first and second internal electrodes 121 and 122.

The center part internal electrodes 120c refer to internal electrodes positioned in the center of the first and second internal electrodes in the stacking direction of the first and second internal electrodes 121 and 122.

The area $A_{cover}$ refers to the area of the non-electrode regions N present in the cover part internal electrodes in the cross-section in the length-thickness (L-T) direction, and the area $A_{center}$ refers to the area of the non-electrode regions N present in the center part internal electrodes in the cross-section in the length-thickness (L-T) direction. Here, $A_{cover}$ and $A_{center}$ need to be measured in the same cross-sectional area.

When a content of the ceramic filler based on the conductive metal in the cover part internal electrodes is defined as $C_{cover}$ and a content of the ceramic filler based on the conductive metal in the center part internal electrodes is defined as $C_{center}$, the ceramic filler may be included such that $1.05 \leq C_{cover}/C_{center} \leq 3.00$ may be satisfied, in order to control a value of $A_{center}/A_{cover}$.

In the case in which $A_{center}/A_{cover}$ is lower than 0.33, capacitance may be deteriorated to cause difficulty in implementing target capacitance, and in the case in which $A_{center}/A_{cover}$ is greater than 0.95, shrinkage cracks may be generated during the sintering process of the ceramic body.

Therefore, $A_{center}/A_{cover}$ may be equal to or greater than 0.33 and equal to or smaller than 0.95.

In addition, when a thickness of each of the dielectric layers is defined as Td and a thickness of each of the first and second internal electrodes is defined as Te, the multilayer ceramic capacitor according to the embodiment of the present invention may be manufactured such that $0.5 \leq Te/Td \leq 1.2$ is satisfied. The thicknesses of the dielectric layers and the internal electrodes are controlled in order to prevent the occurrence of shrinkage cracks. In the case in which the multilayer ceramic capacitor is manufactured such that Te/Td is greater than 1.2, the shrinkage cracks may be generated in the sintering process, while in the case in which the multilayer ceramic capacitor is manufactured such that Te/Td is lower than 0.5, it may be difficult to implement target capacitance.

Therefore, the multilayer ceramic capacitor may be manufactured such that Te/Td may be 0.5 to 1.2.

In addition, the thickness of each of the first and second internal electrodes 121 and 122 may be appropriately determined according to usage thereof, or the like, for example, may be 0.7 μm or less. Alternatively, the first and second internal electrodes 121 and 122 may respectively have a thickness of 0.1 to 0.5 μm. Alternatively, the first and second internal electrodes 121 and 122 may respectively have a thickness of 0.3 to 0.5 μm.

The thickness of each of the first and second internal electrodes 121 and 122 may refer to an average thickness of the first and second internal electrodes disposed between the dielectric layers.

The average thickness of the first and second internal electrodes 121 and 122 may be measured from an image obtained by scanning the cross-section of the ceramic body 110 in the length-thickness (L-T) direction using a scanning electron microscope (SEM).

For example, the average thickness may be calculated by measuring respective thicknesses of an internal electrode at thirty points thereof having equal intervals therebetween in a width direction, the internal electrode being extracted from an image obtained by scanning the cross-section of the ceramic body 110 in the length-thickness (L-T) direction cut in a central portion of the ceramic body 110 in the width direction, that is, the W direction, using the scanning electron microscope (SEM).

The thirty points having equal intervals therebetween may be measured in a capacitance formation part, wherein the capacitance formation part refers to a region in which the first and second internal electrodes 121 and 122 overlap each other.

In addition, in the case in which the measurement of the average thickness is applied to ten or more internal electrodes, such that the average of thicknesses of ten or more internal electrodes is measured, the average thickness of the internal electrodes may be significantly generalized.

According to the embodiment of the present invention, the dielectric layers having the internal electrodes formed thereon may be stacked in an amount of 250 layers or more, and seven or more dielectric layers may be stacked per 10 μm of thickness of the ceramic body.

The average thickness of the first and second internal electrodes 121 and 122 may be measured from an image obtained by scanning the cross-section of the ceramic body 110 in the width direction using the scanning electron microscope (SEM).

As the internal electrodes and the dielectric layers of the multilayer ceramic electronic component are thinned and stacked in increasing amounts, a difference in shrinkage amount between the capacitance formation part on which the internal electrodes are printed and a region on which the internal electrodes are not printed may be rapidly increased due to a difference in shrinkage temperature between the internal electrodes and the dielectric layers during the sintering of the ceramic body. Therefore, shrinkage cracks may be frequently generated between a margin part and the capacitance formation part or a cover part and the capacitance formation part. However, in the case of controlling an area ratio of the non-electrode regions in the center part internal electrodes and the cover part internal electrodes according to the embodiment of the present invention, a shrinkage rate of the cover part internal electrodes may be decreased and strength thereof may be enhanced to alleviate stress applied to the cover part, thereby suppressing the occurrence of shrinkage cracks.

Therefore, according to the embodiment of the present invention, the multilayer ceramic electronic component having high reliability may be provided by controlling the area of the non-electrode regions present in the internal electrodes and by controlling the thicknesses of the internal electrodes and the dielectric layers.

Experimental Example

The following Table 1 shows data as to whether or not shrinkage cracks are generated and whether or not target capacitance is implemented according to a content ratio of a ceramic filler to a conductive metal and an area ratio of non-electrode regions, in cover part internal electrodes and center part internal electrodes of respective multilayer ceramic capacitors.

The multilayer ceramic capacitors according to experimental examples of the present embodiment were respectively manufactured as follows.

First, a slurry including a powder such as a barium titanate ($BaTiO_3$) powder having an average particle size of 0.05 to 0.2 μm, was applied to carrier films and dried thereon to prepare a plurality of ceramic green sheets, thereby forming dielectric layers.

Then, a conductive paste for an internal electrode was prepared by mixing nickel particles and second particles (the ceramic filler) in a ratio shown in Table 1 below. In the experimental examples of the present invention, $C_{cover}$ indicates a content of the ceramic filler based on the conductive metal (Nickel) in the cover part internal electrodes, and $C_{center}$ indicates a content of the ceramic filler based on the conductive metal (Nickel) in the center part internal electrodes.

In addition, in the experimental examples of the present invention, $A_{cover}$ indicates an area of the non-electrode regions in the cover part internal electrodes among first and second internal electrodes in a cross-section of a ceramic body in a length-thickness (L-T) direction, and $A_{center}$ indicates an area of the non-electrode regions in the center part internal electrodes among the first and second internal electrodes in the cross-section of the ceramic body in the length-thickness (L-T) direction.

After the conductive paste for internal electrode was applied to the green sheets by a screen printing method to form internal electrodes, the internal electrodes were stacked in an amount of 220 to 300 layers to form a stacked body.

Then, the stacked body was compressed and cut to form a chip having a 0603 standard size, and the chip was sintered at a temperature of 1050 to 1200 under a reducing atmosphere in which $H_2$ is 0.1% or less.

Next, a process for forming external electrodes, and a plating process, and the like were performed to manufacture the multilayer ceramic capacitor, and electrical properties of the multilayer ceramic capacitor were evaluated. As a result of measuring capacitance of the chip, in the case in which the capacitance was deteriorated by 10% or more (for example, in the case of capacitance of 4.23 uF or less when target capacitance is 4.7 uF), it was determined that the target capacitance was not implemented.

With respect to 50 ceramic bodies which were sintered and manufactured under the same conditions as described above, whether or not shrinkage cracks are generated in a margin part on which the internal electrodes are not printed and a vicinity of a boundary portion of the capacitance formation part on which the internal electrodes are printed was observed from an image obtained by observing the cross-section of each ceramic body in a width-thickness (W-T) direction cut in a central portion of the ceramic body in the length direction, that is, "L" direction using an optical microscope, as shown in FIG. 2B.

The multilayer ceramic capacitors were respectively manufactured such that a thickness ratio of the internal electrode and the dielectric layer was 1:1 in experimental data of the following Table 1.

TABLE 1

| Sample | $C_{cover}/C_{center}$ | $A_{center}/A_{cover}$ | Target Capacitance Implementation | Whether or Not Shrinkage Cracks are generated |
|---|---|---|---|---|
| 1* | 1.00 | 1.00 | ○ | ○ |
| 2 | 1.05 | 0.95 | ○ | X |
| 3 | 1.10 | 0.90 | ○ | X |
| 4 | 1.50 | 0.66 | ○ | X |
| 5 | 2.00 | 0.50 | ○ | X |
| 6 | 3.00 | 0.33 | ○ | X |
| 7* | 3.50 | 0.25 | X | X |
| 8* | 4.00 | 0.20 | X | X |

*Comparative Example
○: Cracks are generated after sintering, Capacitance is 90% or more as compared to target capacitance
X: Cracks are not generated after sintering, Capacitance is less than 90% as compared to target capacitance It may be appreciated from Table 1 above that in sample 1, Comparative Example corresponding to the case in which $A_{center}/A_{cover}$ is less than 0.95, cracks are generated after the sintering process to cause defects in reliability, and in samples 7 and 8, Comparative Examples corresponding to the cases in which $A_{center}/A_{cover}$ is more than 0.33, the target capacitance may not be obtained.

In the samples 3 to 6, Inventive Examples of the present invention, corresponding to the cases satisfying the numerical ranges of the present invention, cracks were not generated after the sintering process and the target capacitance could be obtained, such that the multilayer ceramic capacitor having high capacitance and excellent reliability could be implemented.

The following Table 2 shows data as to whether or not shrinkage cracks are generated and whether or not target capacitance is implemented according to a ratio Te/Td of a thickness Te of an internal electrode and a thickness Td of a dielectric layer in the respective multilayer ceramic capacitors manufactured by the above-described method of the present invention. The multilayer ceramic capacitors were respectively manufactured such that $C_{cover}/C_{center}$ is 1.50 and $A_{center}/A_{cover}$ is 0.66 in data shown in the following Table 2.

TABLE 2

| Sample | Te/Td | Target Capacitance Implementation | Whether or Not Shrinkage Crack Is generated |
|---|---|---|---|
| 1* | 0.3 | X | X |
| 2* | 0.4 | X | X |
| 3 | 0.5 | ○ | X |
| 4 | 0.8 | ○ | X |
| 5 | 1.2 | ○ | X |
| 6* | 1.5 | ○ | ○ |
| 7* | 2.0 | ○ | ○ |
| 8* | 2.5 | ○ | ○ |

*Comparative Example
○: Cracks are generated after sintering, Capacitance is 90% or more as compared to target capacitance
X: Cracks are not generated after sintering, Capacitance is less than 90% as compared to target capacitance It may be appreciated from Table 2 above that in samples 1 and 2, Comparative Example corresponding to the case in which Te/Td is less than 0.5, the target capacitance may not be obtained, and in samples 6 to 8, Comparative Examples, corresponding to the cases in which Te/Td is more than 1.2, cracks were generated after the sintering process to cause defects in reliability.

In the samples 3 to 5, Inventive Examples of the present invention, corresponding to the cases satisfying the numerical ranges of the present invention, cracks were not generated after the sintering process and the target capacitance could be obtained, such that the multilayer ceramic capacitor having high capacitance and excellent reliability could be implemented.

Mounting Board for Multilayer Ceramic Capacitor

Figure 5:
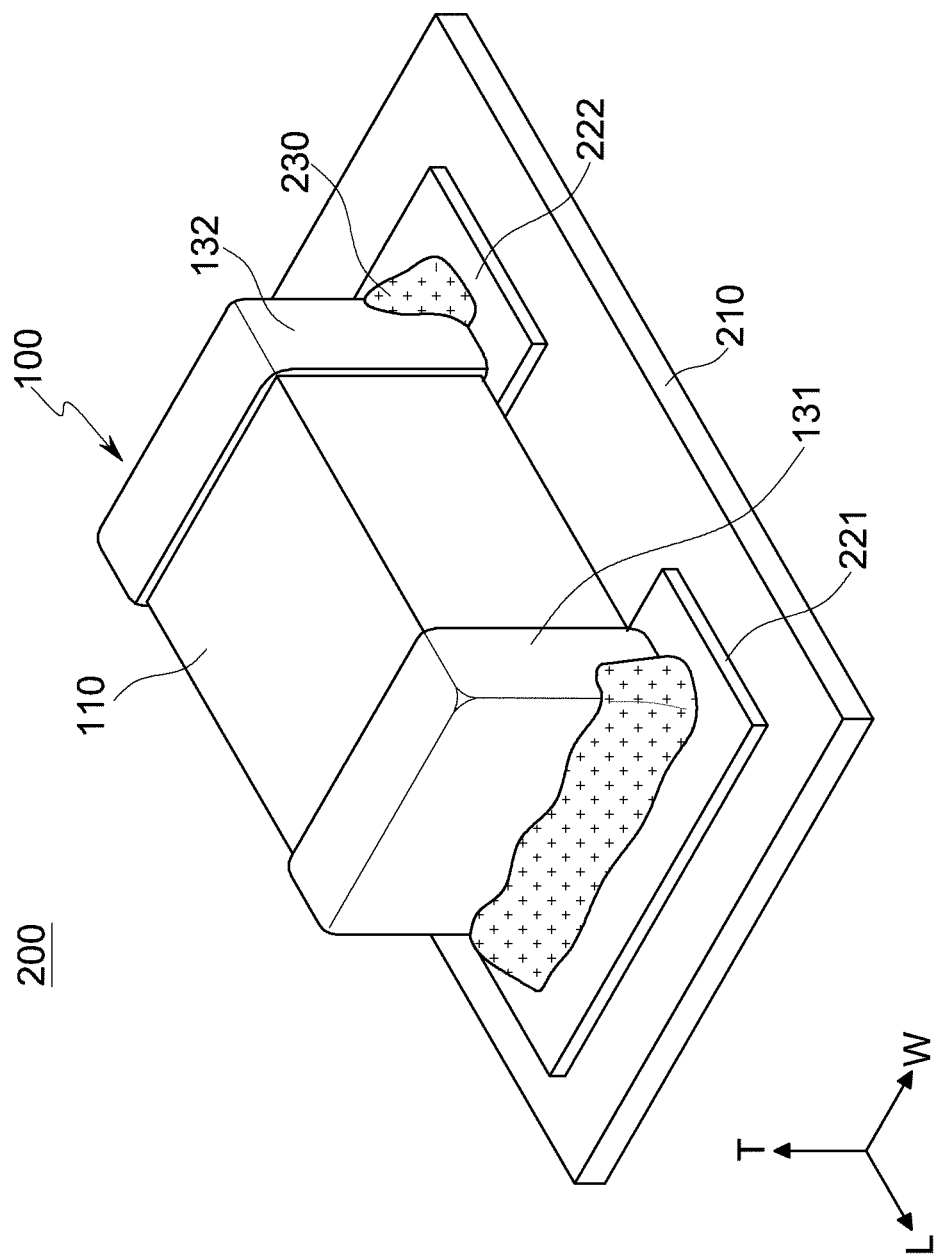
FIG. 5 is a schematic perspective view showing amounting board for the multilayer ceramic capacitor according to the embodiment of the present invention.

FIG. 5 is a schematic perspective view showing a mounting board for a multilayer ceramic capacitor according to another embodiment of the present invention.

Referring to FIG. 5, a mounting board 200 for the multilayer ceramic electronic component according to the embodiment of the present invention may include: a printed circuit board 210 having first and second electrode pads 221 and 222 disposed thereon; and the multilayer ceramic electronic component 100 installed on the printed circuit board, the multilayer ceramic electronic component may including: a ceramic body including dielectric layers; and first and second internal electrodes formed within the ceramic body and disposed to face each other having the respective dielectric layers interposed therebetween, wherein in the cross-section of the ceramic body in the length-thickness (L-T) direction, when an area of non-electrode regions in cover part internal electrodes among the first and second internal electrodes is defined as $A_{cover}$ and an area of non-electrode regions in center part internal electrodes among the first and second internal electrodes is defined as $A_{center}$, a ratio of $A_{center}$ to $A_{cover}$ may satisfy $0.33 \leq A_{center}/A_{cover} \leq 0.95$.

Since a description of the multilayer ceramic capacitor 100 mounted on the printed circuit board 210 in the embodiment of the present invention is overlapped with the description of the multilayer ceramic capacitor according to the foregoing embodiment, the overlapped description thereof will be omitted.

As set forth above, according to the embodiment of the present invention, a multilayer ceramic electronic component having high reliability and a mounting board therefor can be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including dielectric layers; and
first and second internal electrodes formed within the ceramic body and disposed to face each other having the respective dielectric layers interposed therebetween,
wherein in a cross-section of the ceramic body in a length-thickness (L-T) direction, when an area of non-electrode regions in cover part internal electrodes among the first and second internal electrodes is defined as $A_{cover}$ and an area of non-electrode regions in center part internal electrodes among the first and second internal electrodes is defined as $A_{center}$, a ratio of $A_{center}$ to $A_{cover}$ satisfies $0.33 \leq A_{center}/A_{cover} \leq 0.95$.

2. The multilayer ceramic electronic component of claim 1, wherein when a thickness of each of the dielectric layers is defined as Td and a thickness of each of the first and second internal electrodes is defined as Te, $0.5 \leq Te/Td \leq 1.2$ is satisfied.

3. The multilayer ceramic electronic component of claim 1, wherein when a content of a ceramic filler based on a conductive metal in the cover part internal electrodes is defined as $C_{cover}$ and a content of the ceramic filler based on the conductive metal in the center part internal electrodes is defined as $C_{center}$, $1.05 \leq C_{cover}/C_{center} \leq 3.00$ is satisfied.

4. The multilayer ceramic electronic component of claim 3, wherein the conductive metal includes at least one selected from a group consisting of nickel (Ni), manganese (Mn), chrome (Cr), copper (Cu), palladium (Pd), silver (Ag), cobalt (Co), and aluminum (Al).

5. The multilayer ceramic electronic component of claim 3, wherein the ceramic filler includes a ceramic material.

6. The multilayer ceramic electronic component of claim 1, wherein when a thickness of each of the first and second internal electrodes is defined as Te, $0.1\ \mu m \leq Te \leq 0.5\ \mu m$ is satisfied.

7. The multilayer ceramic electronic component of claim 1, wherein the dielectric layers are stacked in an amount of 7 layers or more, per 10 μm of thickness of the ceramic body.

8. A mounting board for a multilayer ceramic electronic component, the mounting board comprising:
   a printed circuit board having first and second electrode pads disposed thereon; and
   a multilayer ceramic electronic component installed on the printed circuit board,
   the multilayer ceramic electronic component including: a ceramic body including dielectric layers; and first and second internal electrodes formed within the ceramic body and disposed to face each other having the respective dielectric layers interposed therebetween, wherein in a cross-section of the ceramic body in a length-thickness (L-T) direction, when an area of non-electrode regions in cover part internal electrodes among the first and second internal electrodes is defined as $A_{cover}$, and an area of non-electrode regions in center part internal electrodes among the first and second internal electrodes is defined as $A_{center}$, a ratio of $A_{center}$ to $A_{cover}$ satisfies $0.33 \leq A_{center}/A_{cover} \leq 0.95$.

9. The mounting board of claim 8, wherein when a thickness of each of the dielectric layers is defined as Td and a thickness of each of the first and second internal electrodes is defined as Te, $0.5 \leq Te/Td \leq 1.2$ is satisfied.

10. The mounting board of claim 8, wherein when a content of a ceramic filler based on a conductive metal in the cover part internal electrodes is defined as $C_{cover}$, and a content of the ceramic filler based on the conductive metal in the center part internal electrodes is defined as $C_{center}$, $1.05 \leq C_{cover}/C_{center} \leq 3.00$ is satisfied.

11. The mounting board of claim 10, wherein the conductive metal includes at least one selected from a group consisting of nickel (Ni), manganese (Mn), chrome (Cr), copper (Cu), palladium (Pd), silver (Ag), cobalt (Co), and aluminum (Al).

12. The mounting board of claim 10, wherein the ceramic filler includes a ceramic material.

13. The mounting board of claim 8, wherein when a thickness of each of the first and second internal electrodes is defined as Te, $0.1\ \mu m \leq Te \leq 0.5\ \mu m$ is satisfied.

14. The mounting board of claim 8, wherein the dielectric layers are stacked in an amount of 7 layers or more, per 10 μm of thickness of the ceramic body.

* * * * *